(12) United States Patent
Baumgartner et al.

(10) Patent No.: US 10,122,597 B2
(45) Date of Patent: Nov. 6, 2018

(54) DETECTING POOR PERFORMING DEVICES

(71) Applicant: Cellco Partnership, Basking Ridge, NJ (US)

(72) Inventors: Jeffrey L. Baumgartner, Concord, CA (US); Steven D. Miller, Southlake, TX (US); Christopher J. Skaer, Roswell, GA (US)

(73) Assignee: Cellco Partnership, Basking Ridge, NJ (US)

( * ) Notice: Subject to any disclaimer, the term of this patent is extended or adjusted under 35 U.S.C. 154(b) by 367 days.

(21) Appl. No.: 14/062,369

(22) Filed: Oct. 24, 2013

(65) Prior Publication Data
US 2015/0120901 A1 Apr. 30, 2015

(51) Int. Cl.
*H04L 12/24* (2006.01)
*H04L 12/26* (2006.01)
*H04W 24/00* (2009.01)

(52) U.S. Cl.
CPC ........ *H04L 41/507* (2013.01); *H04L 43/0823* (2013.01); *H04L 43/16* (2013.01); *H04W 24/00* (2013.01)

(58) Field of Classification Search
CPC ........ H04L 12/26; H04W 24/00; H04W 72/02
USPC ....................................................... 709/224
See application file for complete search history.

(56) References Cited

U.S. PATENT DOCUMENTS

| | | | | |
|---|---|---|---|---|
| 5,706,333 A * | 1/1998 | Grenning | ........... | H04W 24/00 379/29.01 |
| 5,859,838 A * | 1/1999 | Soliman | ............ | H04B 7/216 370/249 |
| 6,944,449 B1 * | 9/2005 | Gandhi | ............... | H04W 72/085 455/425 |
| 7,447,506 B1 * | 11/2008 | MacKenzie | ........... | H04W 72/02 370/332 |
| 2005/0124369 A1 * | 6/2005 | Attar | ..................... | H04W 24/08 455/522 |
| 2011/0320588 A1 * | 12/2011 | Raleigh | ............... | H04W 36/245 709/224 |
| 2012/0135738 A1 * | 5/2012 | Yoshihara | ............. | H04W 48/18 455/436 |

(Continued)

OTHER PUBLICATIONS

Lauro, "Drop Sessions (Part 1 of 2)", Iteuniversity.com/get_trained/expert_opinion1/b/lauroortigoza/archive/2012/03/28/drop-sessions-part-1-of-2.aspx, Mar. 28, 2012, 5 pages.

(Continued)

*Primary Examiner* — Nicholas R Taylor
*Assistant Examiner* — Meng Vang

(57) ABSTRACT

A device is configured to determine a set of performance indicators associated with a base station and a set of user devices, and determine that a quantity of the set of user devices does not exceed a threshold. The device is configured to receive performance information based on the set of performance indicators, and store the performance information based on determining that the quantity of the set of user devices does not exceed the threshold. The device is configured to determine a performance problem, associated with the base station, based on the performance information, and determine that a user device, of the set of user devices, is associated with the performance problem. The device is configured to provide information that identifies the user device.

20 Claims, 8 Drawing Sheets

(56) References Cited

U.S. PATENT DOCUMENTS

| | | | | |
|---|---|---|---|---|
| 2012/0208581 A1* | 8/2012 | Ishida | ............ | H04B 7/0691 |
| | | | | 455/509 |
| 2012/0252440 A1* | 10/2012 | Watanabe | ......... | H04W 24/02 |
| | | | | 455/423 |
| 2013/0267230 A1* | 10/2013 | Lin | ............ | H04W 24/10 |
| | | | | 455/436 |

OTHER PUBLICATIONS

EventHelix.com Inc., "LTE Attach and Default Bearer Setup Messaging", http://www.eventhelix.com/lte/attach/LTE-Attach-Messaging.pdf, 2012, 14 pages.

* cited by examiner

| Device ID 510 | Device Type 520 | Time Interval 530 | Total Call 540 | Attach Failure 550 | Initial Context Setup Failure 560 | Context Drop 570 | PDN Connection Failure 580 |
|---|---|---|---|---|---|---|---|
| 135.314.3.1 | Base Station | 1 Minute | 12 | 1 | 2 | 0 | 1 |
| 311480018033497 | User Device | 1 Minute | 1 | 1 | 0 | 0 | 0 |
| 310150123798456 | User Device | 1 Minute | 1 | 0 | 1 | 0 | 1 |

DETECTING POOR PERFORMING DEVICES

BACKGROUND

A communication network may include one or more network devices to provide a service (e.g., cellular telephone service, internet service, etc.) to a set of user devices (e.g., cellular telephones, computers, etc.). A service provider may monitor the performance of the one or more network devices, for example to detect and/or resolve performance problems associated with the one or more network devices.

BRIEF DESCRIPTION OF THE DRAWINGS

FIG. 5 is a diagram of an example data structure that stores performance information.

DETAILED DESCRIPTION OF PREFERRED EMBODIMENTS

The following detailed description of example implementations refers to the accompanying drawings. The same reference numbers in different drawings may identify the same or similar elements.

A service provider (e.g., a cellular telephone service provider, an internet service provider, etc.) may monitor one or more network devices (e.g., associated with a network) by use of a set of performance indicators. A performance indicator may include a metric (e.g., a characteristic, an attribute, etc.) that suggests whether a network device (e.g., a base station) is performing within acceptable standards. A performance device may receive performance information (e.g., information that identifies how the network device is performing based on the performance indicators), and may determine that the network device is experiencing a performance problem based on determining that a performance indicator associated with the network device exceeds a threshold.

However, some performance problems may be caused by a user device as opposed to the network device (e.g., such as a malfunctioning cellular telephone connected to the base station). In this instance, the performance device may determine that there is a performance problem but may be unable to distinguish whether the performance problem is associated with the network device or the user device. To determine whether the performance problem is due to the user device or the network device, the performance device may monitor a set of user devices based on the performance indicators (e.g., for all user devices connected to the base station) in addition to monitoring the base station based on the set of performance indicators. However, such monitoring may require a substantial quantity of computational resources (e.g., memory resources, processing resources, etc.), especially when the network device is connected to a large quantity of user devices (e.g., a quantity of user devices that is greater than an average quantity of user devices). Implementations described herein may allow a performance device to determine whether a performance problem is due to a network device or a user device, and to limit an amount of computational resources (e.g., memory, processing, etc.) needed to determine the performance problem.

Figure 1A:
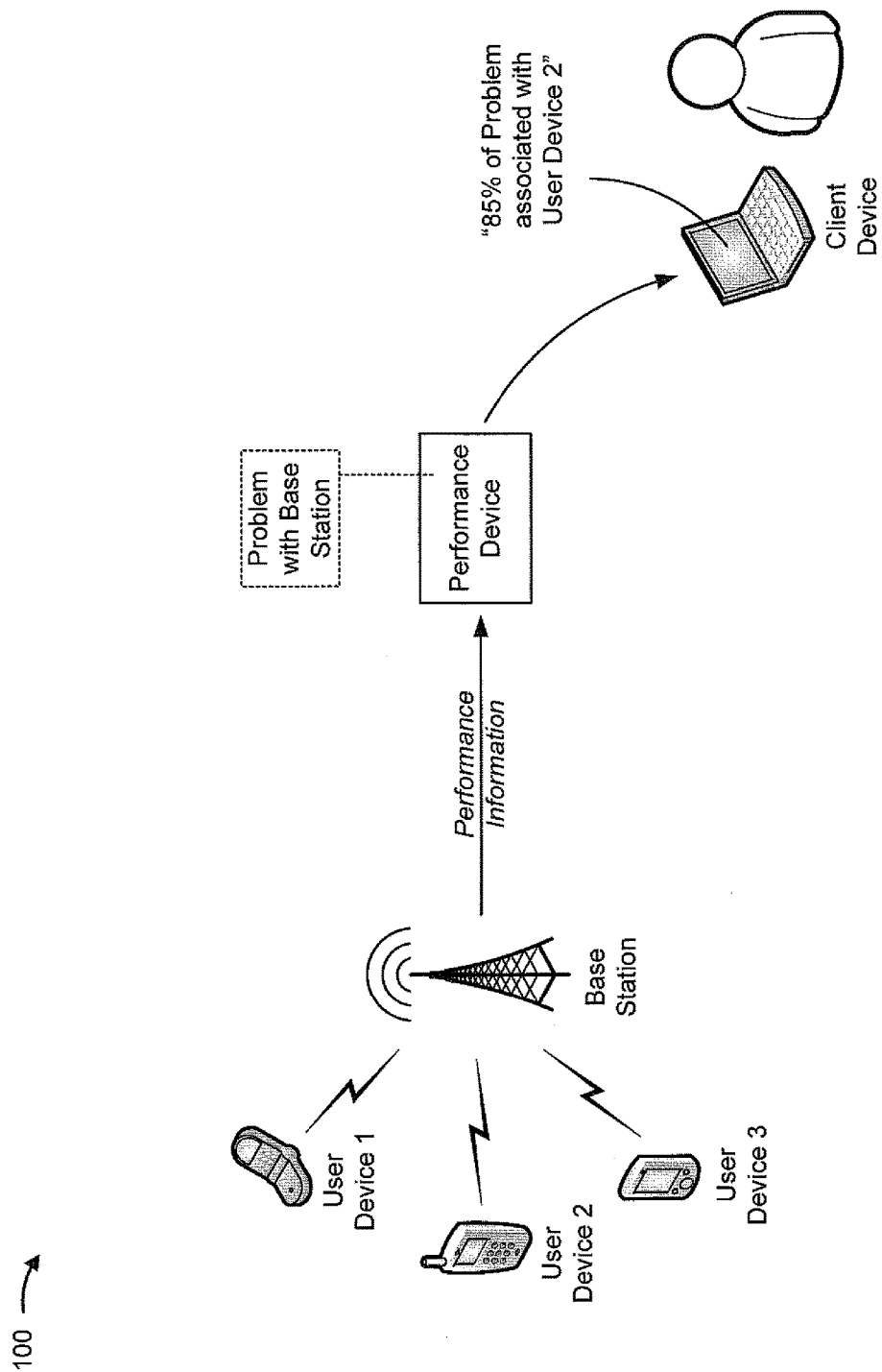
FIGS. 1A-1B are diagrams of an overview of an example implementation described herein.
Figure 1B:
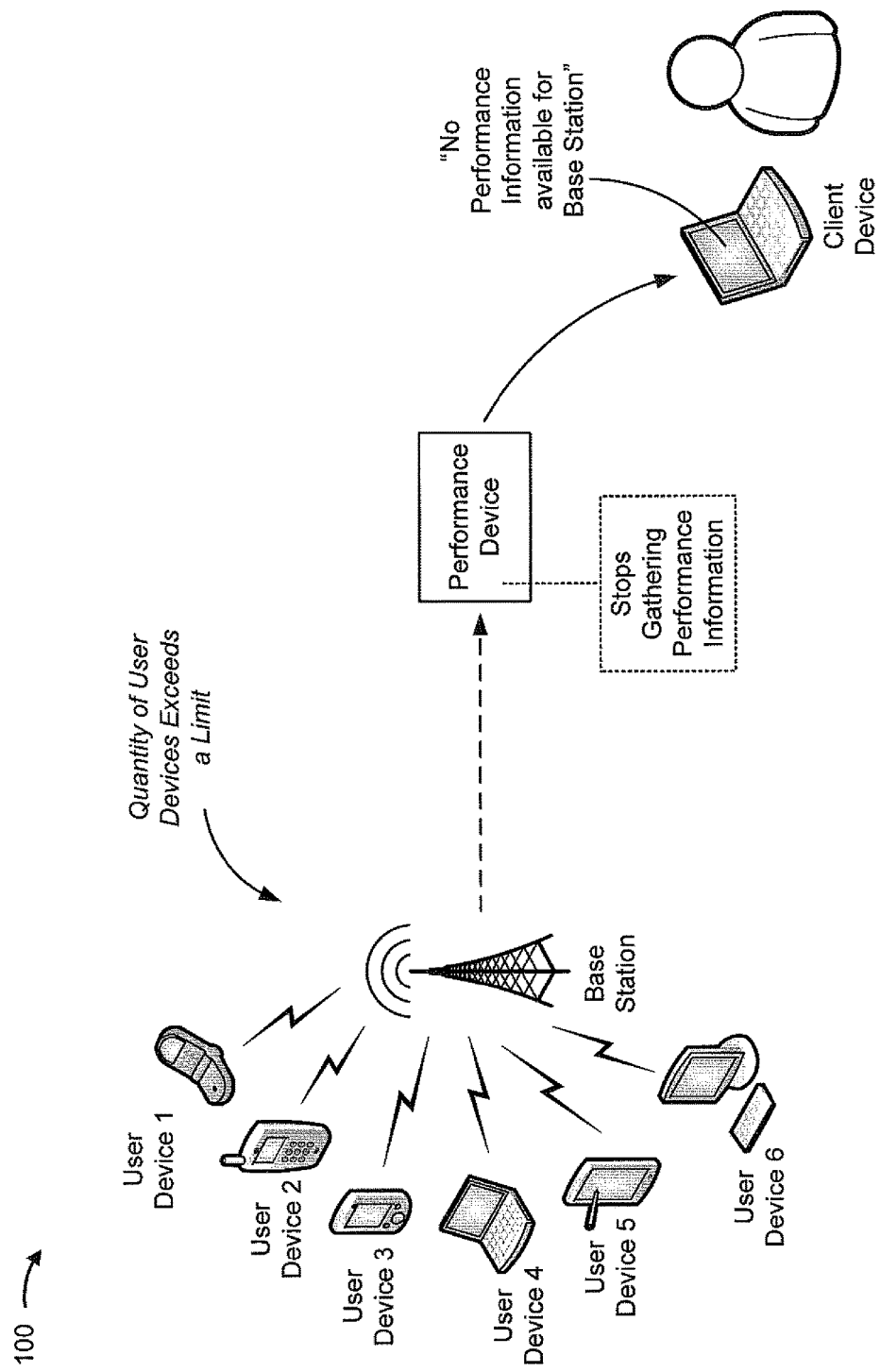

FIGS. 1A-1B are diagrams of an overview of an example implementation 100 described herein. As shown in FIGS. 1A-1B, example implementation 100 may include a set of user devices, a base station, a performance device, and a client device.

As shown in FIG. 1A, the set of user devices may include a first user device (e.g., "User Device 1"), a second user device (e.g., "User Device 2"), and a third user device (e.g., "User Device 3"). The set of user devices may connect to the base station, and may transmit and/or receive data traffic (e.g., telephone calls, emails, video broadcasts, etc.). The base station may generate performance information based on a set of performance indicators. The performance information may identify how the base station is performing according to the performance indicators. The base station may provide the performance information to the performance device.

As further shown in FIG. 1A, based on the performance information, the performance device may determine that the base station is associated with a performance problem (e.g., a greater than average quantity of dropped calls). Based on the performance information, the performance device may determine an extent to which the performance problem is associated with a particular one of the user device (e.g., the first user device, the second user device, or the third user device). The performance device may provide a notification to the client device indicating that a portion of the problem (e.g., 85%) is due to the particular user device (e.g., the second user device).

As shown in FIG. 1B, a fourth user device (e.g., "User Device 4"), a fifth user device (e.g., "User Device 5"), and a sixth user device (e.g., "User Device 6") may join the set of user devices (e.g., may transmit data traffic to and/or receive data traffic from the base station). The quantity of user devices (e.g., 6) may exceed a limit (e.g., 5). Based on determining that the quantity of user devices exceeds the limit, the performance device may stop receiving the performance information (e.g., so as to ensure that computational resources, such as memory and processing, are not overloaded). The performance device may provide a notification to the client device indicating that the performance information is no longer available for the base station. In this manner, the performance device may determine that the performance problem is due to a particular user device, and may limit an amount of computational resources used to collect, process, and/or store the performance information.

Figure 2:
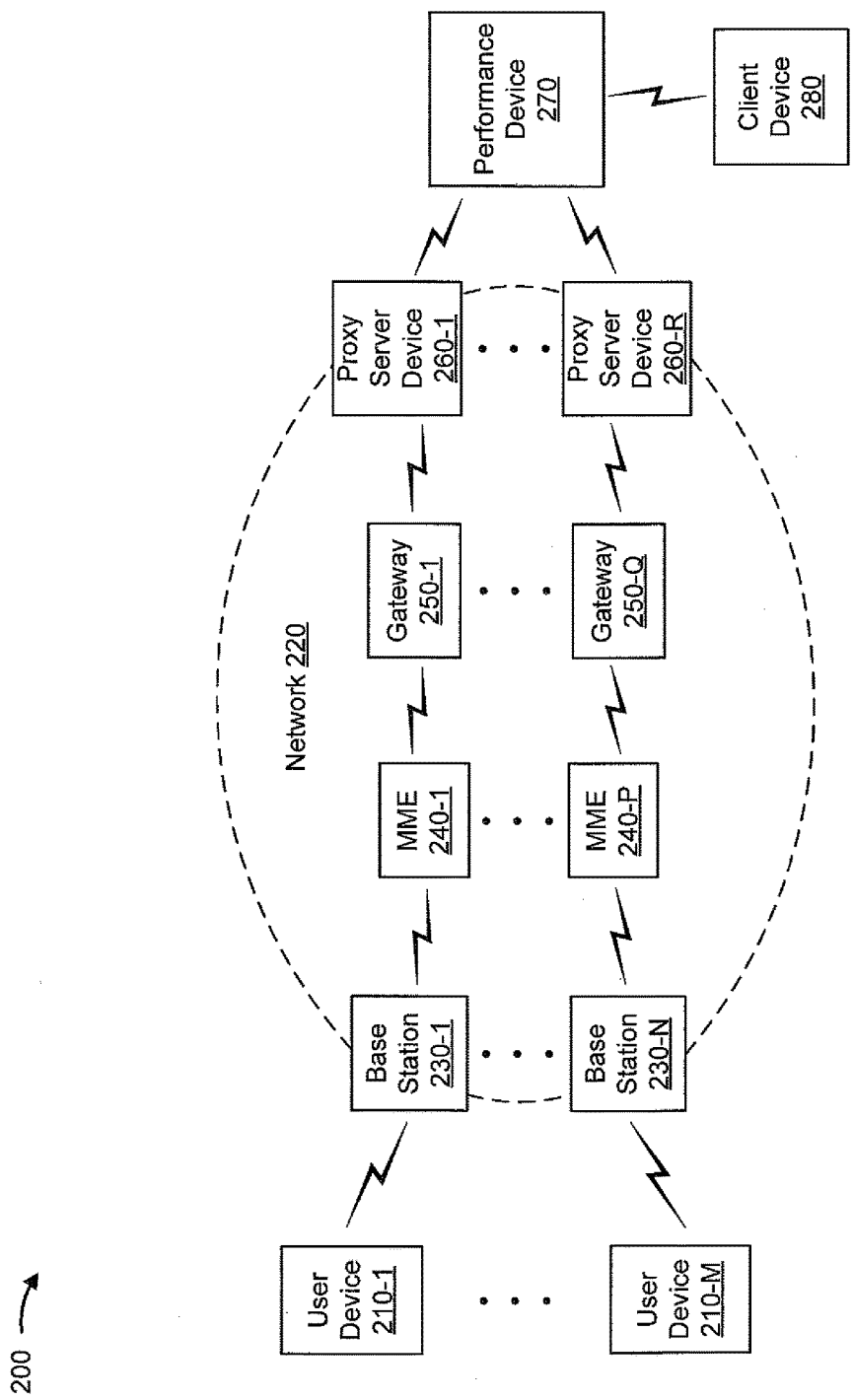
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user devices 210-1 . . . 210-M (M≥1) (hereinafter referred to collectively as "user devices 210," and individually as "user device 210), a network 220, base stations 230-1 . . . 230-N (N≥1) (hereinafter referred to collectively as "base stations 230," and individually as "base station 230"), mobile management entity devices 240-1 . . . 240-P (P≥1) (hereinafter referred to collectively as "MMEs 240," and individually as "MME 240"), gateways 250-1 . . . 250-Q (Q≥1) (hereinafter referred to collectively as "gateways 250," and individually as "gateway 250"), proxy server devices 260-1 . . . 260-R (R≥1) (hereinafter referred to collectively as "proxy server devices 260," and individually as "proxy server device 260"), a performance device 270, and a client device 280. Devices of environment 200 may interconnect via wired connections, wireless connections, or a combination of wired and wireless connections.

User device 210 may include a device capable of receiving information from and/or transmitting information to base station 230 and/or network 220. For example, user device 210 may include a computational and/or communication device, such as a mobile telephone (e.g., a smartphone, a cellular telephone, etc.), a laptop computer, a tablet computer, a handheld computer, a desktop computer, or a similar device.

Network 220 may include one or more wired and/or wireless networks. For example, network 220 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, or a combination of these or other types of networks. In some implementations, network 220 may include base station 230, MME 240, gateway 250, and/or proxy server device 260.

Base station 230 may include one or more devices that receive, process, and/or transmit traffic, such as audio, video, text, and/or other data, destined for and/or received from user device 210. In some implementations, base station 230 may include an eNB associated with an LTE network that receives traffic from and/or sends traffic to MME 240. Additionally, or alternatively, one or more base stations 230 may be associated with a RAN that is not associated with an LTE network. Base station 230 may send traffic to and/or receive traffic from user device 210 via an air interface. In some implementations, base station 230 may be associated with a small cell, such as a microcell, a picocell, and/or a femtocell.

MME 240 may include one or more computation and/or communication devices that gather, process, search, store, and/or provide information in a manner described herein. In some implementations, MME 240 may facilitate selection of gateway 250 to serve traffic to and/or from user devices 210. In some implementations, MME 240 may perform an operation associated with handing off user device 210 from a first base station 230-1 to a second base station 230-2 when user device 210 is transitioning from a cell associated with the first base station 230-1 to a cell associated with the second base station 230-2. Additionally, or alternatively, MME 240 may select another MME 240, to which user device 210 should be handed off (e.g., when user device 210 moves out of range of MME 240).

Gateway 250 may include one or more computation and/or communication devices that gather, process, search, store, and/or provide information in a manner described herein. For example, gateway 250 may include one or more data processing and/or traffic transfer devices, such as a gateway, a router, a modem, a switch, a network interface card ("NIC"), a hub, a bridge, a proxy server device, on optical add/drop multiplexer ("OADM"), or any other type of device that processes and/or transfers traffic.

Proxy server device 260 may include a device capable of receiving, storing, processing, and/or transmitting information, such as information associated with the performance of one or more devices of network 220. For example, proxy server device 260 may include a computing device, such as a server device or a similar device. In some implementations, proxy server device 260 may receive and/or provide information based on a request by another device, such as performance device 270.

Performance device 270 may include a device capable of monitoring the performance of one or more devices associated with network 220. For example, performance device 270 may include a computer device, a server device, or a similar device. In some implementations, performance device 270 may receive information from and/or transmit information to user device 210, base station 230, MME 240, gateway 250, proxy server device 260, and/or client device 280.

Client device 280 may include a device capable of receiving, processing, and/or displaying information, such as information associated with the performance of one or more devices of network 220. For example, client device 280 may include a computer device, such as a desktop computer, a laptop computer, a server, a tablet computer, a handheld computer, or a similar device. In some implementations, client device 270 may receive information from and/or transmit information to user device 210, base station 230, MME 240, gateway 250, proxy server device 260, and/or performance device 270.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
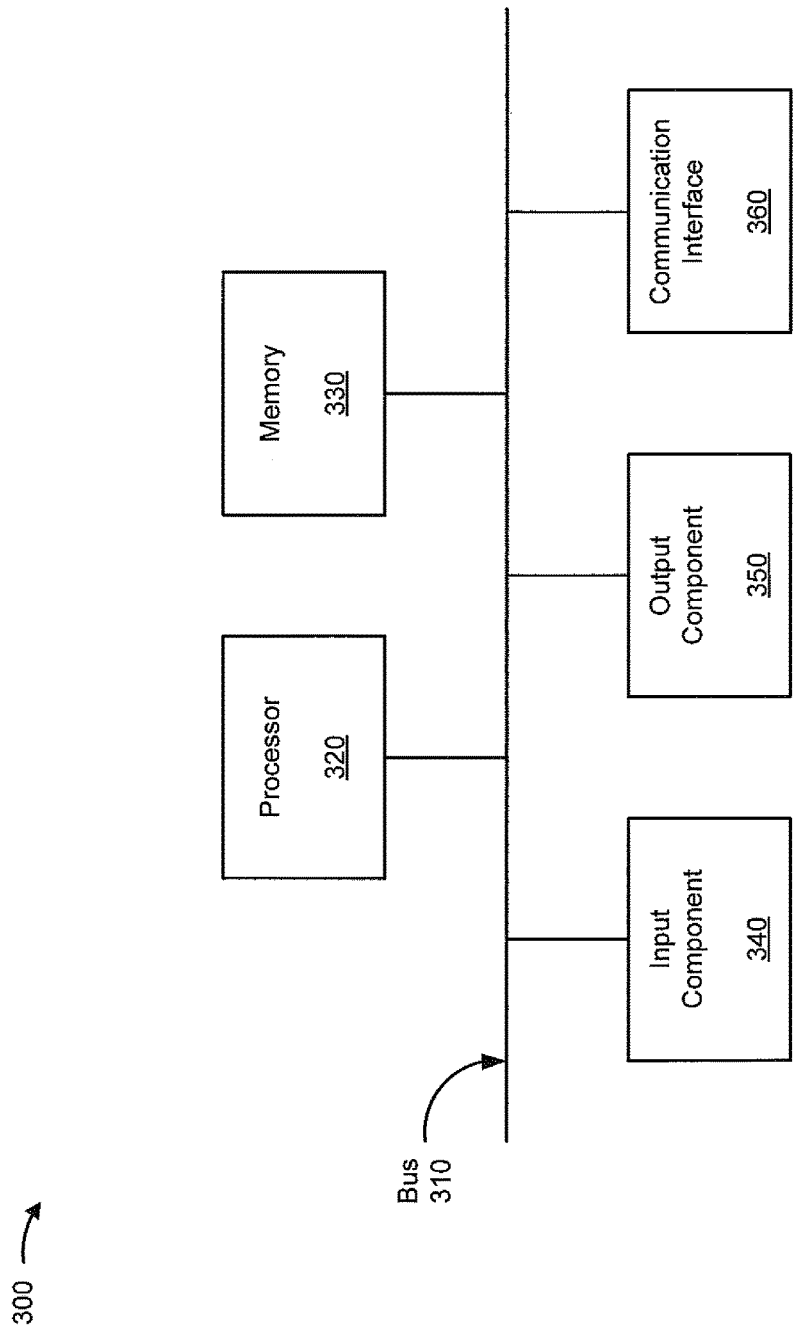
FIG. 3 is a diagram of example components of one or more devices of FIG. 2.

FIG. 3 is a diagram of example components of a device 300. Device 300 may correspond to user device 210, base station 230, MME 240, gateway 250, proxy server device 260, performance device 270, and/or client device 280. Additionally, or alternatively, each of user device 210, base station 230, MME 240, gateway 250, proxy server device 260, performance device 270, and/or client device 280 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
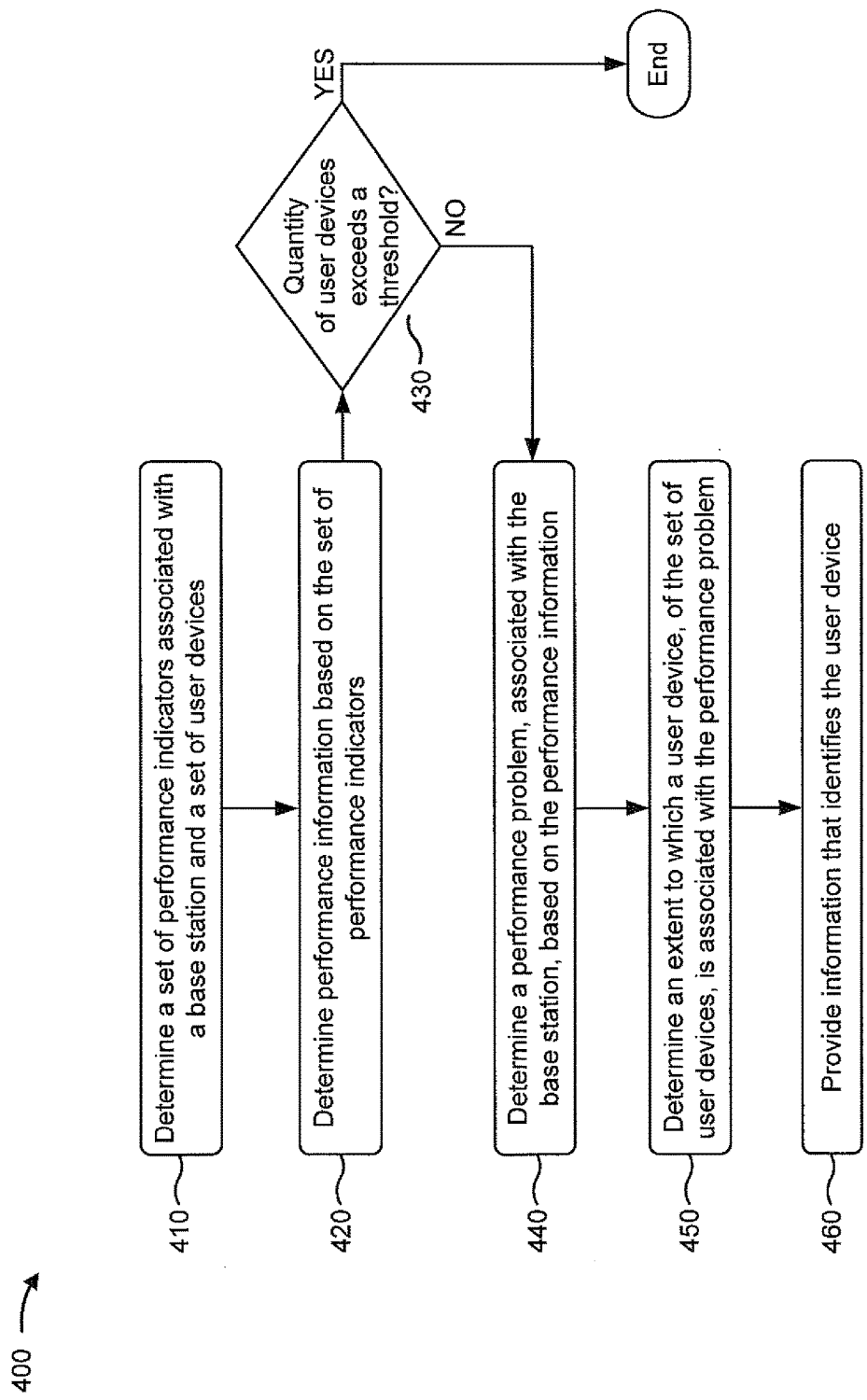
FIG. 4 is a flow chart of an example process for determining that a performance problem associated with a base station is due to a user device.

FIG. 4 is a flow chart of an example process 400 for determining that a performance problem associated with a base station is due to a user device. In some implementations, one or more process blocks of FIG. 4 may be performed by performance device 270. Additionally, or alternatively, one or more process blocks of FIG. 4 may be performed by another device or a group of devices separate from or including performance device 270, such as user device 210, base station 230, MME 240, gateway 250, proxy server device 260, and/or client device 280.

As shown in FIG. 4, process 400 may include determining a set of performance indicators associated with a base station and a set of user devices (block 410). For example, performance device 270 may determine the set of performance indicators, and may provide the set of performance indicators to one or more devices of network 220 (e.g., base station 230, MME 240, gateway 250, proxy server device 260, etc.). In some implementations, performance device 270 may determine the set of performance indicators based on user input. For example, a user of performance device 270 may provide the set of performance indicators to performance device 270 via a user interface. Additionally, or alternatively, client device 280 may determine the set of performance indicators (e.g., based on user input), and may provide the set of performance indicators to performance device 270.

In some implementations, the set of performance indicators may include information used to evaluate the performance of base station 230 and/or related devices (e.g., user device 210, MME 240, gateway 250, etc.). For example, base station 230 may receive data traffic from and/or transmit data traffic to user devices 210. The data traffic may include voice information (e.g., voice calls), video information (e.g., video calls, video broadcasts, etc.), email information, short message service ("SMS") text message information, or the like. A performance indicator, of the set of performance indicators, may identify an attribute, associated with a manner in which base station 230 (e.g., and related devices) processes the data traffic, that suggests whether base station 230 (e.g., and related devices) are performing within acceptable standards.

In some implementations, the performance indicator may include a value of attach failures associated with base station 230 (e.g., a count of failures by user devices 210 to gain access to network 220 via base station 230). For example, user device 210 may fail to connect to network 220 due to a failure (e.g., by one or more devices of network 220) to create a call session, to update a location of user device 210 (e.g., a failure to transfer subscriber related information between MME 240 and a home subscriber server ("HSS")), or the like.

In some implementations, the performance indicator may include a value of initial context setup failures associated with base station 230 (e.g., a count of failures by user devices 210 to establish a connection to transfer information to network 220). Additionally, or alternatively, the performance indicator may include a value of context drops associated with base station 230 (e.g., a count of dropped calls between user devices 210 and network 220).

In some implementations, the performance indicator may include a value of packet data network ("PDN") connection failures associated with base station 230 (e.g., a count of failures by user devices 210 to establish a connection to a PDN network). Additionally, or alternatively, the performance indicator may include a value of handover failures associated with base station 230 (e.g., a count of failures to transfer user device 210 from a first base station 230-1 to a second base station 230-2).

As further shown in FIG. 4, process 400 may include determining performance information based on the set of performance indicators (block 420). For example, performance device 270 may determine the performance information associated with base station 230 and user devices 210. Additionally, or alternatively, one or more devices of network 220 (e.g., base station 230, MME 240, gateway 250, and/or proxy server device 260) may determine the performance information, and may provide the performance information to performance device 270.

In some implementations, the performance information may include information that identifies how base station device 230 and/or related devices (e.g., user devices 210, MME 240, gateway 250, etc.) are performing based on the set of performance indicators. For example, the performance information may identify a quantity of failures associated with data traffic received and/or transmitted by base station 230 (e.g., a quantity of attach failures, a quantity of initial context setup failures, a quantity of context drops, a quantity of PDN connection failures, a quantity of handover failures, etc.).

In some implementations, the performance information may identify one or more devices involved in receiving and/or transmitting the data traffic. For example, the performance information may include an identifier associated with the one or more devices (e.g., a user device identifier, a base station identifier, an MME identifier, a gateway identifier, etc.). In some implementations, the identifier may include one or more characters (e.g., letters, numbers, symbols, etc.) that uniquely identify the device, such as an internet protocol ("IP") address, an international mobile subscriber identity ("IMSI"), or the like.

In some implementations, performance device 270 may determine the performance information based on one or more connection records. A connection record may include information associated with a connection between base station 230 and one or more user devices 210 (e.g., a connection for transmitting and/or receiving data traffic). For example, the connection record may include information that identifies a connection length (e.g., a call length), a connection time (e.g., a call time), whether the connection was successful, whether the connection is associated with any failures (e.g., attach failures, initial context setup failures, context drops, PDN connection failures, handover failures, etc.), or the like.

In some implementations, the connection record may be associated with a connection between base station 230 and a single user device 210 (e.g., may be associated with a single connection). In some implementations, the connection record may be associated with a connection between base station 230 and a set of user devices 210. Additionally, or alternatively, the connection record may be associated with a set of base stations 230, a set of MMEs 240, and/or a set of gateways 250. For example, proxy server device 260 may receive connection records associated with a set of gateways 250 serving a set of MMEs 240 associated with a set of base stations 230, and may generate a single connection record that includes connection information for the set of base stations 230, MMEs 240, and gateways 250.

In some implementations, the connection record may be associated with a time interval. For example, MME 240 may generate a connection record based on data traffic received and/or transmitted by base station 230 during the time interval (e.g., a 1 minute time interval). MME 240 may provide the connection record to performance device 270 after an end of the time interval (e.g., after 1 minute). In some implementations, the MME 240 may provide a new connection record, to performance device 270, after the end of another time interval (e.g., associated with an additional 1 minute of data traffic received and/or transmitted by base station 230). Thus, network 220 may regularly provide connection records to performance device 270 (e.g., at an interval of every minute).

In some implementations, performance device 270 may determine the performance information based on the connection records. For example, performance device 270 may parse the connection records to determine values for each performance indicator, of the set of performance indicators, for base station 230. Additionally, or alternatively, performance device 270 may parse the connection records to determine values for each performance indicator, of the set of performance indicators, for one or more user devices 210 associated with base station 230.

In some implementations, performance device 270 may determine a performance record. The performance record may include performance information associated with base station 230, user device 210, and/or a collection of base stations 230 and/or user devices 210. In some implementations, performance device 270 may store the performance record for a period of time (e.g., in a data structure associated with performance device 270). For example, performance device 270 may store a quantity of performance records corresponding to the period of time (e.g., the most recent 60 minutes).

In some implementations, performance device 270 may store a rolling set of performance records corresponding to the period of time (e.g., 60 minutes). For example, performance device 270 may store a quantity of performance records (e.g., a set of 60 performance records) in the data structure. Performance device 270 may determine a new performance record (e.g., based on receiving a new connection record), and may add the new performance record to the quantity of performance records (e.g., the set of 60 performance records). Performance device 270 may remove a performance record (e.g., of the set of 60 performance records) corresponding to an oldest performance record.

In some implementations, performance device 270 may determine performance information associated with a particular set of base stations 230, a particular set of MMEs 240, a particular set of gateways 250, or the like. For example, performance device 270 may determine performance information associated with particular network devices associated with a vendor. Additionally, or alternatively, performance device 270 may determine performance information associated with a geographic region (e.g., associated with base stations 230 in a geographic region). For example, proxy server devices 260 may be associated with a geographic region. Proxy server device 260 may receive connection records associated with the geographic region via base stations 230, MMEs 240, and/or gateways 250 (e.g., via base stations 230, MMEs 240, and/or gateways 250 serving the geographic region). Performance device 270 may determine performance information associated with the geographic region based on the connection records associated with proxy server device 260.

As further shown in FIG. 4, process 400 may include determining whether a quantity of user devices exceeds a threshold (block 430). For example, performance device 270 may determine whether the quantity of user devices 210, connected to base station 230, exceeds a threshold. Additionally, or alternatively, base station 230, MME 240, gateway 250, and/or proxy server device 260 may determine whether the quantity of user devices exceeds the threshold.

In some implementations, performance device 270 may determine the threshold based on an amount of storage (e.g., memory) associated with base station 230, MME 240, and/or performance device 270. For example, performance device 270 may determine that the storage (e.g., associated with performance device 270) may store performance information associated with a particular quantity of user devices 210 (e.g., 100 user devices 210) associated with base station 230. Performance device 270 may determine that the threshold may be the particular quantity of user devices 210 (e.g., 100 user devices 210).

In some implementations, performance device 270 may determine the threshold based on a worst case scenario. For example, the worst case scenario may include an estimate of an amount of memory used by a quantity of base stations 230 and a quantity of user devices 210 for a set of performance indicators. In some implementations, performance device 270 may determine the worst case scenario by multiplying the quantity of base stations 230 times the quantity of performance indicators times the quantity of time intervals times the quantity of user devices 210 times the size of the data structure (e.g., associated with performance device 270). Performance device 270 may determine the threshold by determining the quantity of base stations 230 such that the size of the data structure is sufficient for the quantity of user devices 210 and the quantity of performance indicators.

In some implementations, if the quantity of user devices 210 exceeds the threshold (block 430—YES), process 400 may end. For example, if the quantity of user devices 210 exceeds the threshold, performance device 270 may stop receiving performance information associated with the set of user devices 210. In some implementations, performance device 270 may continue receiving performance information associated with base station 230 (e.g., excluding performance information associated with user devices 210).

In some implementations, performance device 270 may determine that the quantity of user devices 210, associated with base station 230, no longer exceeds the threshold (e.g., that the quantity of user devices 210 is less than the threshold after a period of time). Based on determining that the quantity of user devices 210 no longer exceeds the threshold, performance device 270 may again receive performance information associated with the set of user devices 210 (e.g., process 400 may return to block 420).

As further shown in FIG. 4, if the quantity of user devices does not exceed the threshold (block 440—NO), process 400 may include determining a performance problem, associated with the base station, based on the performance information (block 440). For example, performance device 270 may determine the performance problem based on performance information associated with base station 230.

In some implementations, the performance problem may include an instance where base station 230 and/or related devices (e.g., user devices 210, MME 240, gateway 250, etc.) performs outside of acceptable standards (e.g., acceptable operating parameters). For example, the performance problem may include an instance where one or more performance indicators, associated with base station 230, indicate that base station 230 is experiencing an operating problem.

In some implementations, performance device 270 may provide an alarm (e.g., a notification) based on determining the performance problem. For example, performance device 270 may provide the alarm to client device 280, and client device 280 may output the alarm (e.g., the notification) to a user of client device 280.

In some implementations, performance device 270 may determine the performance problem based on determining that values, associated with a performance indicator, exceed a threshold (e.g., a hard limit). For example, performance device 270 may determine that base station 230 is associated with a quantity of dropped calls (e.g., context drops) during a period of operation (e.g., that base station 230 is associated with 15 dropped calls during a minute of operation). Performance device 270 may determine that there is a performance problem based on determining that the quantity of dropped calls (e.g., 15) exceeds a threshold quantity of dropped calls (e.g., 10).

In some implementations, the threshold may include a percentage. For example, performance device 270 may determine that a percentage of total calls, associated with base station 230, are dropped during a period of operation (e.g., that 57% of calls during a minute of operation are dropped calls). Performance device 270 may determine that there is a performance problem based on determining that the percentage of dropped calls (e.g., 57%) exceeds a threshold percentage of dropped calls (e.g., 50%).

In some implementations, performance device 270 may determine the performance problem based on determining that the performance information satisfies a minimum threshold. For example, performance device 270 may determine that there is a performance problem (e.g., excessive dropped calls) based on determining that the percentage of dropped calls exceeds a threshold percentage of dropped calls, and that base station 230 is associated with a minimum quantity of total calls (e.g., at least 10 total calls during the operation period).

In some implementations, performance device 270 may determine the thresholds based on a history of performance information. The history of performance information may include past performance information associated with base station 230 (e.g., a previous week of performance information, a previous month of performance information, etc.). For example, performance device 270 may story the history of performance information in a data structure (e.g., associated with performance device 270) for a period of time (e.g., 8 weeks).

In some implementations, based on the history of performance information, performance device 270 may determine a normal range of values for each of the performance indicators (e.g., average values, maximum values, minimum values, etc.). Performance device 270 may determine the performance problem by determining that a performance indicator is outside of the normal range (e.g., deviates from the average value, is greater than the maximum value, is less than the minimum value, etc.). In some implementations, performance device 270 may determine the performance problem by comparing current performance information to a history of performance information associated with a similar time (e.g., a similar time of day, a similar day of the week, etc.).

In some implementations, performance device 270 may determine the thresholds based on user input. For example, performance device 270 may receive user input, from a user of performance device 270, which identifies a set of thresholds associated with the set of performance indicators. Additionally, or alternatively, performance device 270 may receive the set of thresholds from client device 280.

As further shown in FIG. 4, process 400 may include determining an extent to which a user device, of the set of user devices, is associated with the performance problem (block 450). For example, performance device 270 may determine the extent to which user device 210 is associated with the performance problem.

In some implementations, performance device 270 may determine how the set of user devices 210 behave with respect to a performance indicator associated with the performance problem. For example, performance device 270 may determine that base station 230 is associated with a performance problem (e.g., that 87% of calls associated with base station 230 during a period of time are dropped). Based on the performance information associated with user devices 210 (e.g., connected to base station 230 during the period of time), performance device 270 may determine that a particular user device 210 is associated with the problem (e.g., that 91% of the dropped calls are associated with the particular user device 210).

As further shown in FIG. 4, process 400 may include providing information that identifies the user device (block 460). For example, performance device 270 may provide, to client device 280, information that identifies user device 210. Additionally, or alternatively, performance device 270 may provide information that identifies the performance problem, the set of performance indicators, and/or devices of network 220 associated with the performance problem (e.g., base station 230, MME 240, gateway 250, etc.).

In some implementations, performance device 270 may provide a notification to user device 210 (e.g., the particular user device 210 associated with the performance problem). For example, performance device 270 may provide a notification (e.g., an email, an SMS text message, etc.) indicating that user device 210 may be malfunctioning. Additionally, or alternatively, performance device 270 may provide the notification to another device (e.g., a customer service device) to cause the device to notify user device 210, or a user of user device 210, that user device 210 is associated with a performance problem. In some implementations, performance device 270 may prevent user device 210 from accessing network 220 (e.g., may drop user device 210, may block user device 210, etc.).

Although FIG. 4 shows example blocks of process 400, in some implementations, process 400 may include additional blocks, fewer blocks, different blocks, and/or differently arranged blocks than those depicted in FIG. 4. Additionally, or alternatively, two or more of the blocks of process 400 may be performed in parallel.

FIG. 5 is a diagram of an example data structure that stores performance information. Data structure 500 may be stored in a memory device (e.g., a RAM, a hard disk, etc.), associated with one or more devices and/or components of FIGS. 2 and 3. For example, data structure 500 may be stored by performance device 270.

As shown in FIG. 5, data structure 500 may include a collection of fields, such as device ID field 510, device type field 520, time interval field 530, total call field 540, attach failure field 550, initial context setup failure field 560, context drop field 570, and PDN connection failure field 580.

Device ID field 510 may store information that identifies a device associated with the performance information. For example, device ID field 510 may store a device identifier. The device identifier may include one or more characters (e.g., letters, numbers, symbols, etc.) that uniquely identify the device, such as user device 210, base station 230, or the like. In some implementations, the device identifier may include an IP address. Additionally, or alternatively, the device identifier may include an IMSI number.

Device type field 520 may store information that identifies and/or describes a device type of the device identified by device ID field 510. In some implementations, device ID field 510 may identify whether the device is a base station (e.g., base station 230), a user device (e.g., user device 210), or the like. Device type field 520 may store one or more characters (e.g., letters, numbers, symbols, etc.) that identify and/or describe the device type (e.g., a device name, a product name, a model number, etc.).

Time interval field 530 may store information that identifies a time interval associated with the performance information (e.g., the performance information associated with the device identified by device ID field 510). In some implementations, the time interval may include a period of time (e.g., a quantity of seconds, a quantity of minutes, etc.), and time interval field 530 may store one or more characters that identify the period of time (e.g., numbers). Additionally, or alternatively, time interval field 530 may store a time stamp (e.g., a starting time, an ending time, etc.) associated with the period of time.

Total call field 530 may store information that identifies a quantity of calls associated with the device (e.g., identified by device ID field 510) during the period of time (e.g., identified by time interval field 530). In some implementations, total call field 530 may store a value (e.g., a number) corresponding to the quantity of calls. Additionally, or alternatively, total call field 530 may store one or more identifiers (e.g., a call identifier) associated with the quantity of calls.

Attach failure field 550 may store information that identifies a value of attach failures associated with the device. For example, attach failure field 550 may store a quantity of attach failures associated with the device (e.g., identified by device ID field 510) during the period of time (e.g., identified by time interval field 530). In some implementations, attach failure field 550 may store a value (e.g., a number) corresponding to a quantity of times a device (e.g., user device 210) failed to attach to base station 210.

Initial context setup failure field 560 may store information that identifies a value of initial context setup failures. For example, initial context setup failure field 560 may store a quantity of initial context setup failures associated with the device (e.g., identified by device ID field 510) during the period of time (e.g., identified by time interval field 530). In some implementations, initial context setup failure field 560 may store a value (e.g., a number) corresponding to a quantity of times a device (e.g., user device 210) failed to connect to base station 230 to transfer information to network 220.

Context drop field 570 may store information that identifies a value of context drops associated with the device. For example, context drop field 570 may store a quantity of context drops associated with the device (e.g., identified by device ID field 510) during the period of time (e.g., identified by time interval field 530). In some implementations, context drop field 570 may store a value (e.g., a number) corresponding to a quantity of times a device (e.g., user device 210) experienced a dropped call.

PDN connection failure field 580 may store information that identifies a value of PDN connection failures associated with the device. For example, PDN connection failure field 580 may store a quantity of PDN connection failures associated with the device (e.g., identified by device ID field 510) during the period of time (e.g., identified by time interval field 530). In some implementations, PDN connection failure field 580 may store a value (e.g., a number) corresponding to a quantity of times a device (e.g., user device 210) failed to establish a connection to a PDN network.

Information associated with a single device may be conceptually represented as a row in data structure 500. For example, the first row in data structure 500 may correspond to a base station 230 identified by an IP address (e.g., "135.314.3.1) and device type (e.g., "Base Station"). During the time interval (e.g., "1 Minute"), base station 230 may have experienced a total quantity of calls (e.g., "12"), a quantity of attach failures (e.g., "1"), a quantity of initial context setup failures (e.g., "2"), a quantity of context drops (e.g., "0"), and a quantity of PDN connection failures (e.g., "1").

The second row in data structure 500 of FIG. 5 may correspond to a first user device 210-1 connected to base station 230. The first user device 210-1 may be identified by an IMSI (e.g., "311480018033497") and device type (e.g., "User Device"). During the time interval (e.g., "1 Minute"), first user device 210-1 may have experienced a total quantity of calls (e.g., "1"), a quantity of attach failures (e.g., "1"), a quantity of initial context setup failures (e.g., "0"), a quantity of context drops (e.g., "0"), and a quantity of PDN connection failures (e.g., "0"). Based on the quantity of attach failures associated with first user device 210-1 (e.g., "1") and the quantity of attach failures associated with base station 230 (e.g., "1"), performance device 270 may determine that first user device 210-1 is associated with a 100% of the attach failures associated with base station 230.

The third row in data structure 500 of FIG. 5 may correspond to a second user device 210-2 connected to base station 230. The second user device 210-2 may be identified by an IMSI (e.g., "310150123798456") and device type (e.g., "User Device"). During the time interval (e.g., "1 Minute"), second user device 210-2 may have experienced a total quantity of calls (e.g., "1"), a quantity of attach failures (e.g., "0"), a quantity of initial context setup failures (e.g., "1"), a quantity of context drops (e.g., "0"), and a quantity of PDN connection failures (e.g., "1"). Based on the quantity of initial context setup failures associated with second user device 210-2 (e.g., "1") and the quantity of initial context setup failures associated with base station 230 (e.g., "2"), performance device 270 may determine that second user device 210-2 is associated with 50% of the initial context setup failures associated with base station 230. Likewise, based on the quantity of PDN connection failures associated with second user device 210-2 (e.g., "1"), and the quantity of PDN connection failures associated with base station 230 (e.g., "1"), performance device 270 may determine that second user device 210-2 is associated with 100% of the PDN connection failures associated with base station 230.

As indicated above, FIG. 5 is provided merely as an example. Other examples are possible and may differ from what was described with regard to FIG. 5.

Figure 6A:
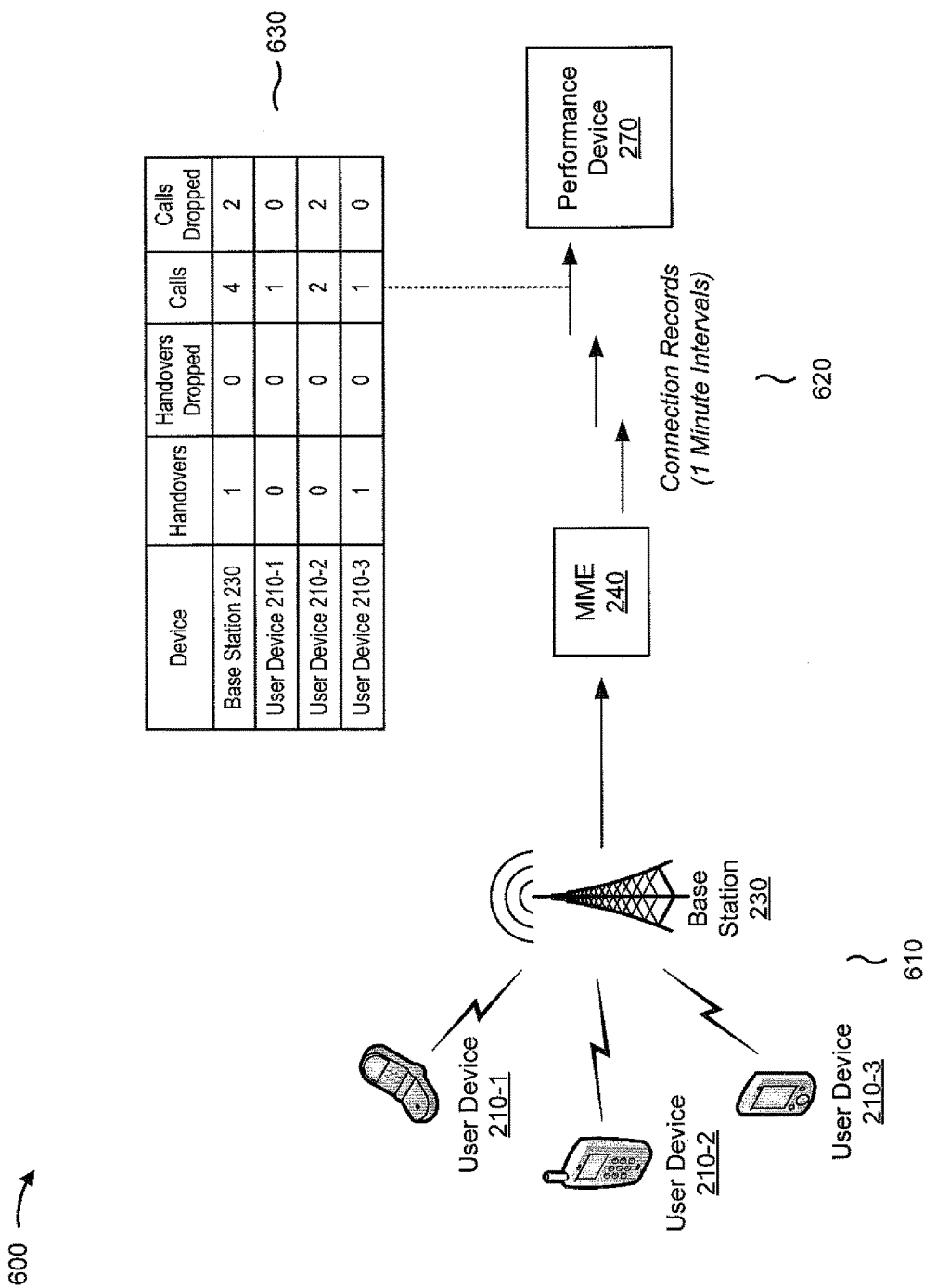
FIGS. 6A-6B are diagrams of an example implementation relating to the example process shown in FIG. 4.
Figure 6B:
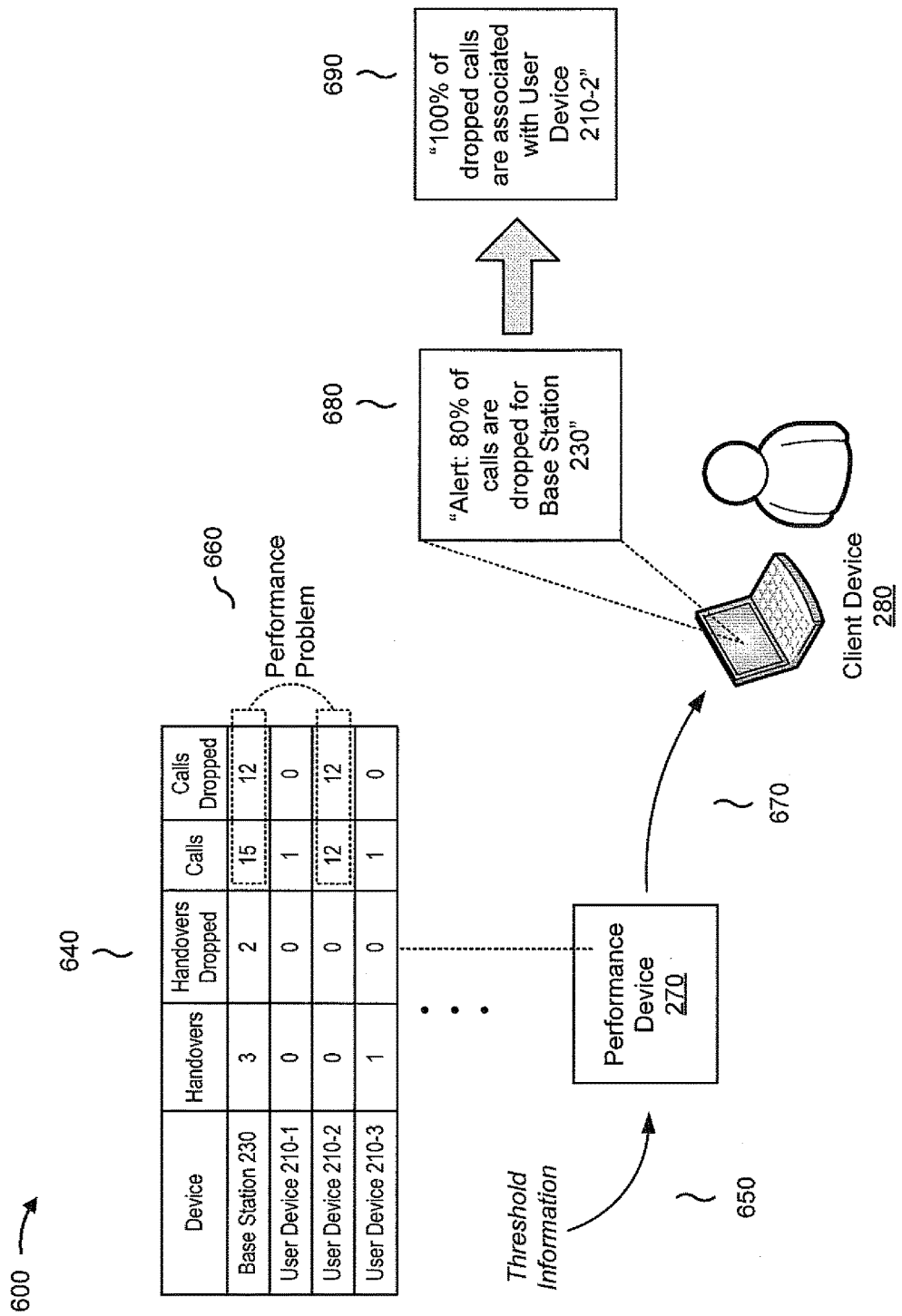

FIGS. 6A-6B are diagrams of an example implementation 600 relating to process 400 (FIG. 4). In example implementation 600, performance device 270 may determine that a performance problem, associated with a base station 230, is associated with a particular user device 210 of a set of user devices 210.

As shown in FIG. 6A, and by reference number 610, base station 230 may receive and transmit data traffic associated with a set of user devices 210 (e.g., a first user device 210-1, a second user device 210-2, and a third user device 210-3). As shown by reference number 620, MME 240 may generate a set of connection records based on information associated with the connections between the set of user devices 210 and base station 230. MME 240 may generate a first connection record corresponding to a first minute of operation (e.g., of base station 230), and may provide the first connection record to performance device 270. MME 240 may generate a second connection record corresponding to a second minute of operation, and may provide the second connection record to performance device 270. MME 240 may generate a third connection record corresponding to a third minute of operation, and may provide the third connection record to performance device 270. In this manner, MME 240 may generate connection records at regular intervals (e.g., every minute).

As shown by reference number 630, the first connection record may indicate that, during the first minute of operation, base station 230 was associated with 1 handover, 0 dropped handovers, 4 calls, and 2 dropped calls. Additionally, the first connection record may include information associated with first user device 210-1 (e.g., that first user device 210-1 was associated with 0 handovers, 0 dropped handovers, 1 call, and 0 dropped calls), information associated with second user device 210-2 (e.g., that second user device 210-2 was associated with 0 handovers, 0 dropped handovers, 2 calls, and 2 dropped calls), and information associated with third user device 210-3 (e.g., that third user device 210-3 was associated with 1 handover, 0 dropped handovers, 1 call, and 0 dropped calls).

As shown in FIG. 6B, and by reference number 640, performance device 270 may determine performance information based on a set of performance indicators. The set of performance indicators may include a first performance indicator and a second performance indicator. The first performance indicator may be associated with a quantity of dropped handovers (e.g., between base station 230 and another base station 230). The second performance indicator may be associated with a quantity of dropped calls. Based on the connection records, performance device 270 may determine performance information for the most recent 10 minutes (e.g., may combine performance information determined from the 10 most recent connection records). Based on the performance information, performance device 270 may determine that base station 230 is associated with 3 handovers, 2 dropped handovers, 15 calls, and 12 dropped calls in the last 10 minutes.

As shown by reference number 650, performance device 270 may receive threshold information from a user of performance device 270 (e.g., via user input). The threshold information may identify a set of thresholds, associated with the set of performance indicators, which may cause performance device 270 to determine that there is a performance problem.

As shown by reference number 660, performance device 270 may determine a performance problem based on the performance information. Based on determining that base station 230 was associated with 15 calls and 12 dropped calls during the most recent ten minutes, performance device 270 may determine that the percentage of dropped calls (e.g., 80%) exceeds a threshold (e.g., 50%) identified by the threshold information. Performance device 270 may determine that of the 12 dropped calls associated with base station 230, 12 dropped calls were associated with second user device 210-2 (e.g., second user device 210-2 was associated with 100% of the dropped calls).

As shown by reference number 670, performance device 270 may provide information that identifies the performance problem and second user device 210-2 to client device 280. As shown by reference number 680, client device 280 may display a notification to a user of client device 280 indicating that during the most recent ten minutes, 80% of calls associated with base station 230 were dropped calls. As shown by reference number 690, client device 280 may display a notification to the user of client device 280 indicating that 100% of the dropped calls were associated with second user device 210-2. In this manner, performance device 270 may determine that the performance problem is caused by second user device 210-2 (e.g., and not by base station 230).

As indicated above, FIGS. 6A-6B are provided merely as an example. Other examples are possible and may differ from what was described with regard to FIGS. 6A-6B.

Implementations described herein may allow a performance device to determine whether a performance problem is due to a network device or a user device, and to limit an amount of computational resources (e.g., memory, processing, etc.) needed to determine the performance problem.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein. In some implementations, the user interfaces may be customizable by a device or a user. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
determine a plurality of performance indicators used to evaluate a performance of a base station of a network and a plurality of user devices;
receive performance information based on the plurality of performance indicators,
the performance information identifying a quantity of failures associated with data traffic received or transmitted by the base station;
determine whether a quantity of the plurality of user devices exceeds a threshold;
stop receiving the performance information when the quantity of the plurality of user devices exceeds the threshold and provide a notification indication that the performance information is no longer available, or
determine that the base station is experiencing an operating problem based on the performance information when the quantity of the plurality of user devices does not exceed the threshold;
determine that a first portion of the operating problem exceeds a second portion of the operating problem, the first portion of the operating problem being due to a user device of the plurality of user devices and the second portion of the operating problem being due to other user devices of the plurality of user devices;
determine that the operating problem is caused by the user device, of the plurality of user devices, based on determining that the first portion of the operating problem exceeds the second portion of the operating problem; and
prevent the user device from accessing the network based on determining that the operating problem is caused by the user device.

2. The device of claim 1, where the one or more processors, when determining that the base station is experiencing the operating problem, are to:
determine a particular threshold associated with a performance indicator of the plurality of performance indicators; and
determine that the performance indicator exceeds the particular threshold.

3. The device of claim 2, where the one or more processors, when determining the particular threshold, are to:
determine the particular threshold based on a history of performance information associated with the base station.

4. The device of claim 2, where the one or more processors, when determining the particular threshold, are to:
determine the particular threshold based on determining that a percentage of operations, associated with the base station, are associated with the operating problem.

5. The device of claim 1, where the plurality of performance indicators includes a particular performance indicator,
the particular performance indicator including a quantity of failed attempts, by the plurality of user devices, to gain access to the base station; and
where the one or more processors, when determining that the base station is experiencing the operating problem, are to:
determine that the base station is experiencing the operating problem based on determining that the quantity, of failed attempts to gain access to the base station, exceeds a threshold value.

6. The device of claim 1, where the plurality of performance indicators includes a particular performance indicator,
the particular performance indicator including a quantity of failed attempts, by the plurality of user devices, to receive subscriber related information associated with the plurality of user devices; and
where the one or more processors, when determining that the base station is experiencing the operating problem, are to:
determine that the base station is experiencing the operating problem based on determining that the quantity, of failed attempts to receive the subscriber related information, exceeds a threshold value.

7. The device of claim 1, where the one or more processors, when receiving the performance information, are to:

receive a plurality of connection records, associated with the performance information, at a regular interval; and
where the one or more processors are further to:
    determine a plurality of performance records based on the plurality of connection records; and
    store a rolling set of performance records,
        the rolling set of performance records including a quantity of most recent performance records of the plurality of performance records.

8. A non-transitory computer-readable medium storing instructions, the instructions comprising:
one or more instructions that, when executed by one or more processors, cause the one or more processors to:
    determine a plurality of performance indicators used to evaluate a performance of a base station of a network and a plurality of user devices;
    receive performance information based on the plurality of performance indicators,
        the performance information identifying a quantity of failures associated with data traffic received or transmitted by the base station;
    determine whether a quantity of the plurality of user devices exceeds a threshold;
    stop receiving the performance information when the quantity of the plurality of user devices exceeds the threshold and provide a notification indicating the performance information is no longer available, or
    determine that the base station is experiencing an operating problem based on the performance information when the quantity of the plurality of user devices does not exceed the threshold,
        the operating problem at the base station being determined based on determining that a performance indicator, of the plurality of performance indicators, exceeds a particular threshold;
    determine that a first portion of the operating problem at the base station exceeds a second portion of the operating problem at the base station,
        the first portion of the operating problem being due to a user device of the plurality of user devices and the second portion of the operating problem being due to one or more other user devices of the plurality of user devices;
    determine that the user device, of the plurality of user devices, is causing the operating problem at the base station based on determining that the first portion of the operating problem at the base station exceeds the second portion of the operating problem at the base station; and
    prevent the user device from accessing the network based on determining that the operating problem at the base station is caused by the user device.

9. The non-transitory computer-readable medium of claim 8, where the one or more instructions, that cause the one or more processors to determine that the base station is experiencing the operating problem, cause the one or more processors to:
    determine the particular threshold based on user input.

10. The non-transitory computer-readable medium of claim 8, where the one or more instructions, when executed by the one or more processors, further cause the one or more processors to:
    determine, based on the quantity of the plurality of user devices exceeding the threshold, that the quantity of the plurality of user devices no longer exceeds the threshold; and
    store the performance information based on determining that the quantity of the plurality of user devices no longer exceeds the threshold.

11. The non-transitory computer-readable medium of claim 8, where the plurality of performance indicators includes a particular performance indicator,
    the particular performance indicator including a quantity of dropped calls by the plurality of user devices;
    where the one or more instructions, that cause the one or more processors to determine that the base station is experiencing the operating problem, cause the one or more processors to:
        determine that the base station is experiencing the operating problem based on determining that the quantity of dropped calls exceeds a threshold value; and
    where the one or more instructions, that cause the one or more processors to determine that the user device, of the plurality of user devices, is causing the operating problem, cause the one or more processors to:
        determine that a first portion of the quantity of dropped calls, due to the user device of the plurality of user devices, exceeds a second portion of the quantity of dropped calls due to the one or more other user devices of the plurality of user devices.

12. The non-transitory computer-readable medium of claim 8, where the plurality of performance indicators includes a particular performance indicator,
    the particular performance indicator including a quantity of packet data network ("PDN") connection failures by the plurality of user devices; and
    where the one or more instructions, that cause the one or more processors to determine that the base station is experiencing the operating problem, cause the one or more processors to:
        determine that the base station is experiencing the operating problem based on determining that the quantity of PDN connection failures exceeds a threshold value.

13. The non-transitory computer-readable medium of claim 8, where the one or more instructions, that cause the one or more processors to receive the performance information, cause the one or more processors to:
    receive the performance information associated with a plurality of geographic locations; and
    where the one or more instructions, when executed by the one or more processors, further cause the one or more processors to:
        provide information to a client device based on a particular geographic location of the plurality of geographic locations.

14. The non-transitory computer-readable medium of claim 8, where the notification is a first notification; and
    where the one or more instructions, when executed by the one or more processors, further cause the one or more processors to:
        provide a second notification to a client device that the base station is associated with the operating problem based on determining that the base station is experiencing the operating problem.

15. A method, comprising:
    determining, by a device, a plurality of performance indicators used to evaluate a performance of a base station of a network and a plurality of user devices connected to the base station;
    receiving, by the device, performance information based on the plurality of performance indicators, the performance information identifying a quantity of failures associated with data traffic received or transmitted by the base station;

determining, by the device, whether a quantity of the plurality of user devices exceeds a threshold;

stopping, by the device, receipt of the performance information when the quantity of the plurality of user devices exceeds the threshold and providing a notification indicating that the performance information is no longer available, or determining, by the device, that the base station is experiencing an operating problem based on the performance information when the quantity of the plurality of user devices does not exceed the threshold;

determining, by the device, that a first portion of the operating problem exceeds a second portion of the operating problem, the first portion of the operating problem being due to a user device, of the plurality of user devices, connected to the base station, and the second portion of the operating problem being due to one or more other user devices of the plurality of user devices;

determining, by the device, that the user device is causing the operating problem based on determining that the first portion exceeds the second portion; and preventing, by the device, the user device from accessing the network based on determining that the operating problem is caused by the user device.

16. The method of claim 15, further comprising:
determining the threshold based on a quantity of memory resources available to the device,
the performance information not being received, based on the quantity of the plurality of user devices exceeding the threshold, to prevent an overload of the quantity of memory resources available to the device.

17. The method of claim 15, where the base station is a first base station;
where the plurality of performance indicators includes a performance indicator,
the performance indicator including a quantity of failed handovers between the first base station and a second base station; and
where determining that the base station is experiencing the operating problem comprises:
determining that the base station is experiencing the operating problem based on determining that the quantity of failed handovers exceeds a threshold value.

18. The method of claim 15, where the notification is a first notification; and
where the method further comprises:
providing information that identifies the operating problem and information that identifies the user device; and
providing a second notification to the user device indicating that the user device may be malfunctioning.

19. The method of claim 15, where determining the plurality of performance indicators comprises:
determining the plurality of performance indicators based on user input.

20. The method of claim 15, where the notification is a first notification; and
where the method further comprises:
providing a second notification to another device based on determining that the user device is causing the operating problem.

* * * * *